Aug. 25, 1964    N. W. BELL    3,146,181
MOISTURE ANALYSIS APPARATUS
Filed May 25, 1961

INVENTOR.
NORTON W. BELL
BY Christie, Parker & Hale
ATTORNEYS.

United States Patent Office 3,146,181
Patented Aug. 25, 1964

3,146,181
MOISTURE ANALYSIS APPARATUS
Norton W. Bell, Monrovia, Calif., assignor to Consolidated Electrodynamics Corporation, Pasadena, Calif., a corporation of California
Filed May 25, 1961, Ser. No. 112,596
10 Claims. (Cl. 204—195)

This invention relates to an improvement in solids moisture analysis apparatus. More particularly, it relates to apparatus for use in conjunction with a moisture-absorbing electrolytic cell to regulate the amount of water entering a space.

The determination of small amounts of water in various solid materials has long been a troublesome analytical problem. Until recently the only methods readily available for routine use by the analysts have been classic thermogravimetry and, more recently, the Karl Fischer titration process. Specialized indirect methods involving measurements of conductivity, dielectric constant, and other physical properties of materials have also been employed, but to a more limited extent. Most of the foregoing methods, however, require relatively large amounts of the sample material or available water before reasonable accuracy can be obtained. Often much time and technical skill is required for the proper preparation of the sample and, additionally, in the use of the method of analysis. The equipment required by these processes is often prohibitively expensive. This invention provides an apparatus which is simple to use and which gives extremely high accuracy for a moderate cost.

Many of the analysis methods utilized heretofore, particularly thermogravimetry, are indicative only of the amount of material driven off from the sample during the heating process. If water and other volatile materials are driven off from the sample, the result of such methods is erroneous since the reading then includes the presence of the volatile materials. The apparatus of this invention is responsive only to moisture and provides a true indication of moisture content.

Recently the electrolytic cell has become widely used in fields of endeavor where qualitative or quantitative analysis is desired. A typical electrolytic cell comprises a pair of spaced bifilar conductive wire electrode coils, the coils being supported against the inside wall of an enclosing tube or housing. A film of hygroscopic material, such as phosphorus pentoxide, is deposited on the coils and the housing interior to electrically bridge the spaces between adjacent turns of the two wire helices. A suitable voltage is applied to the two electrode coils and when the hygroscopic material is conductive, say upon absorption of moisture, an electrolytic path exists between the alternately spaced turns of the electrode coils. In operation, therefore, as moisture is absorbed by the hygroscopic material from, say, a gas stream flowing past the coils, the hygroscopic material becomes conductive. Current flows between the coils in the regions of conductivity and the water is electrolyzed into hydrogen and oxygen. The hygroscopic material is thereby continuously regenerated and the electrical current which flows is an accurate measure of the amount of moisture absorption in accordance with Faraday's Law. Further information relating to electrolytic cells of this type is provided in United States Patent 2,816,067 issued to F. A. Keidel on December 10, 1957.

Since the electrolytic cell operates in accord with Faraday's Law, it is inherently a very sensitive and simple apparatus. Such a cell may be used for qualitative or quantitative studies, depending upon the manner in which the equipment auxiliary to the cell is connected and operated.

In an attempt to provide an accurate solids moisture analysis equipment, an electrolytic cell was used in conjunction with an oven in which the sample to be analyzed was heated. A dry gas was passed through the oven and thence through the electrolytic cell. The moisture contained in the gas stream was absorbed from the gas stream and the amount of current flowing in the cell then was read as a measure of the amount of water absorbed.

It is desirable to operate such equipment as fast as possible so that a particular analysis may be carried out in as short time as possible. Yet the process must be carried out slowly enough that the sample does not explode as the moisture is driven off. The problem of destruction of the sample is particularly critical when a very small sample specimen is utilized. Collaterally with this problem of sample explosion is the problem of overloading the cell. It was found that when a sample, such as a sample containing water of hydration, was heated, the water was driven from the sample at an extremely rapid rate once the threshold temperature of water release was reached. The length of the electrolytic cell is dictated by practical considerations, and, with a given cell length, there is a limit to the amount of water which the cell can accommodate at a given instant. Since this moisture analysis is a quantitative process, it is desirable that all of the water driven off from the sample be absorbed in the electrolytic cell. Thus, it was necessary to regulate the rate of moisture release from the sample as a function of the capacity of the cell.

Generally speaking, this invention provides an apparatus for determining the amount of moisture in a space. Controllable means are provided for releasing moisture from a source into the space. The invention comprises an electrolytic cell having a pair of spaced apart electrodes embedded in a film of hygroscopic material. The hygroscopic material is exposed to the space and absorbs moisture from the space. Voltage means are provided for impressing a potential across the cell electrodes for electrolysis of moisture absorbed by the hygroscopic material of the cell. Further, the invention provides means for controlling the moisture release means in a predetermined relation to the electrolysis current of the cell.

The following detailed explanation of this invention is made in conjunction with the accompanying figures, wherein.

Figure 1:
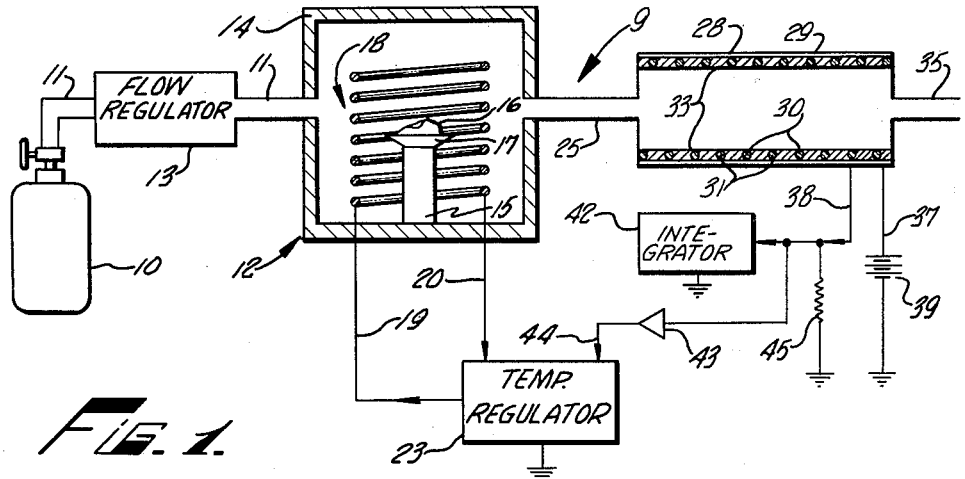
FIGURE 1 is a schematic representation of the apparatus of this invention.

Referring to FIGURE 1, the analysis apparatus 9 is shown. A dry gas supply tank 10 has a duct 11 leading from its top to an oven 12. A flow-regulator 13 is provided between the tank 10 and the oven 12 to accurately measure the rate of gas flow through the duct 11. The oven 12 is lined with a refractory material 14 on all its interior faces. A pedestal 15 is provided in the oven 12 and supports a sample 16, such as hydrated copper sulfate, carried in a container 17 resting on top of the pedestal 15. A radio frequency (RF) induction heating coil 18, serving as a means to release moisture from the sample 16, is mounted circumferentially of the sample 16, the boat 17, and the ceramic pedestal 15. Preferably, the sample 16 is small and the tray or container 17 is in the form of a small platinum boat to have rapid response to changes in the output of the coil 18. Preferably the support pedestal 15 is of a ceramic refractory type material. Leads 19 and 20 extend from the coil 18 to a temperature regulator 23.

A duct 25 extends from the oven 12 opposite from duct 11 and communicates with an electrolytic cell 28. The cell comprises basically a hollow tube 29. A pair of electrodes 30 and 31, in the form of helices, are located within the tube 29 and are alternately spaced apart from one another. Preferably the electrodes 30 and 31 are fabricated from fine platinum wire. A film of hygroscopic material 33 embeds and bridges the electrodes 30 and 31 and has a surface exposed to the interior of the tube 29. An outlet duct 35 from the electrolytic cell 28 is provided at the cell end opposite from the cell inlet duct 25 and vents the cell. A pair of leads or conductors 37 and 38 provide a power circuit to the cell 28.

A direct current (D.C.) voltage supply 39 is provided in conductor 37. The output lead or conductor 38 from the cell 28 communicates with a current integrator 42 and also with a current amplifier 43, the output 44 of which is connected to the temperature regulator 23. A resistor 45 having a value much lower than the impedance of the integrator 42 and the amplifier 43 is provided to assure that the voltage appearing across resistor 45 is proportional to the cell current. The temperature regulator 23 (shown in greater detail in FIGURE 3) is constructed so as to provide that the power level of the heater 18 is regulated inversely to the current flowing in the amplifier output conductor 44.

Figure 3:
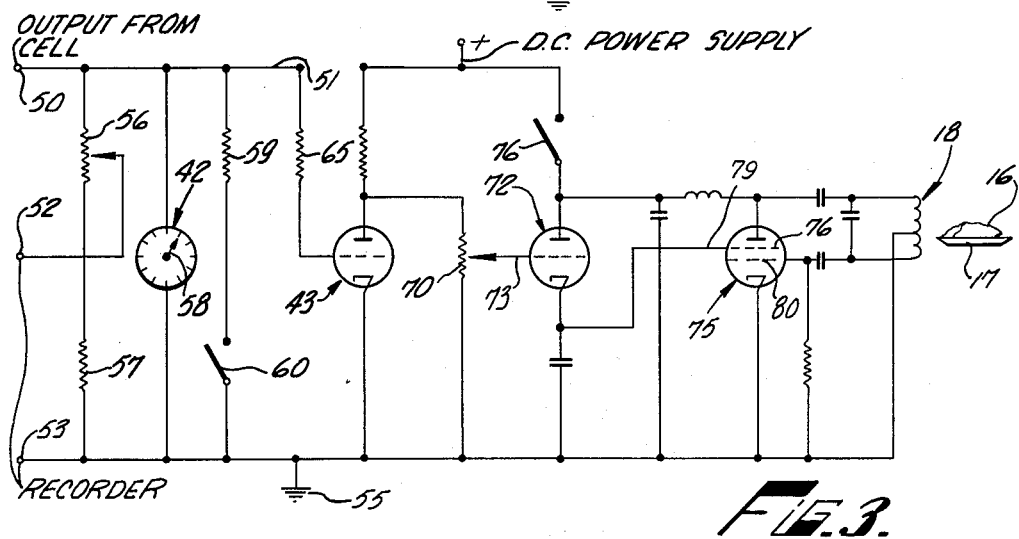
FIGURE 3 is a schematic diagram of the circuitry of the feedback regulator connected between the cell output and the heater input.

Referring now to FIGURE 3, the circuitry of the electric and electronic components of the analysis apparatus 9 is illustrated in schematic form. The electrolytic cell output, as over conductor 38, is provided at the terminal 50. A conductor 51 is provided between input terminal 50 and the D.C. amplifier 43. A pair of strip recorder taps 52 and 53 are provided between conductor 51 and ground at 55. A variable resistor 56 provides adjustment of the recorder to the cell output. A recorder load resistor 57 is provided between taps 52 and 53. The current integrator mechanism 32 is provided in parallel with the recorder terminals 52 and 53. The integrator 42 takes the form of a permanent magnetic field low inertia D.C. motor having speed proportional to applied voltage which drives an indicator pointer 58 moving across a dial calibrated directly in units of weight of moisture absorbed by the cell 28. An integrator braking resistor 59 is provided in parallel with the integrator 42 and is controlled by switch 60.

Cell current flowing through resistors 56 and 57 produces a potential at terminal 50 which is positive with respect to tap 53 and ground. This potential is applied to the D.C. amplifier tube 43 through resistor 65.

The output of the amplifier 43 is passed through a variable resistor 70 and thence to ground. The variable resistor 70 is provided for adjustment of the D.C. amplifier control tube 72 in the cathode follower connection to determine the maximum temperature in oven 12. The output of the amplifier 43 appears at the grid of the control tube 72 via conductor 73 from the temperature control 70. The plate voltage from a D.C. power supply is applied to control tube 72 and to a radio frequency (RF) oscillator tube 75 via switch 76. The response of the control tube 72 is reflected in the screen 78 of the oscillator 75 via conductor 79. The output of the oscillator 75 drives the induction coil 18. The oscillator circuit is completed by connecting the output of the induction 18 to the grid 80 of the oscillator tube 75.

An increase in the cell current will cause tube 43 to conduct more current. The anode voltage of tube 43 will then decrease. This change will appear at the grid of tube 72 attenuated by the temperature adjusting resistor 70 causing tube 72 to conduct less current. The cathode current of tube 72 is the screen 76 current of tube 75 because of the cathode follower connection of tube 72. The reduction in the conduction of the oscillator 75 decreases the output of the oscillator 75 and, accordingly, the output of the RF induction heater 18. Thus, the input to the RF induction coil 18 is maintained as an inverse function of the current supplied at terminal 50 from the output of the electrolytic cell 28. The temperature-balancing resistor 70 regulates the nature of this inverse relation.

Figure 2:
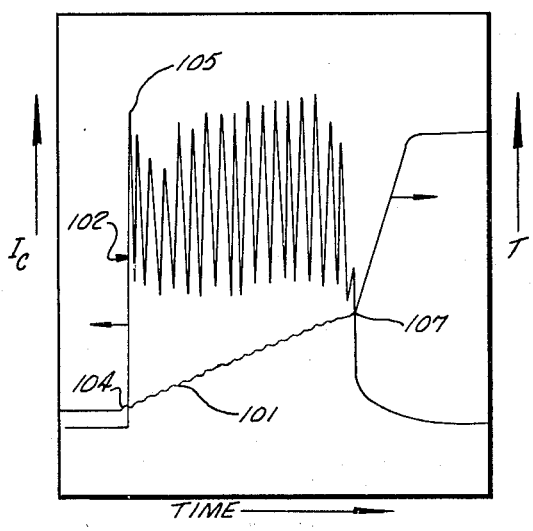
FIGURE 2 is a plot of the cell current and heater output, both as a function of time.

In FIGURE 2, a graphic representation of the inverse relation between the heater 18 and the cell 28 is illustrated. Heater input power is reflected in the oven temperature curve 101 read at the right side of FIGURE 2. The output current of the cell 28 is indicated by curve 102 read in the values of $I_c$, the cell current, at the left ordinate of the figure. When the oven reaches a temperature, as at point 104, such that moisture is first driven off from the sample 16, the moisture release rate is extremely high and the output of the cell rises rapidly to a limit 105. The control tube 72 then functions to reduce the temperature in the oven slightly and the output of the cell 28 falls off as the moisture release rate decreases. Then through operation of the control tube 72 the temperature produced by the induction heater 18 increases gradually in steps to a point 107 at which the effect of the cell output current is negligible. The oscillator 75 is allowed to reach its maximum output as determined by the temperature control 70. The parameters of the components used in the regulator 23 determine the correlation between the cell output and the heater input levels and the effect one has on the other.

The current integrator 42 integrates the area under the curve 102 to provide a record of the total current which flowed in the cell 28 during the period of time which was required to drive off all the moisture from the sample 16. Since coulombs are the true indication of the moisture electrolyzed in the cell 28, a current integrator gives an accurate representation of the water adsorbed since amperes are coulombs per second.

In the apparatus described above, careful regulation of the cell output current can provide practically constant output of the cell 28. In such instances, a simple lapsed-time current integrator is useful. When the lapsed-time integrator is used, the integrator is set to operate when the current reaches its predetermined level as moisture is first released from the sample 16. The integrator turns off when the current from the cell 28 falls below this predetermined level at the end of the analysis.

The primary function of the temperature regulator circuit described above is to monitor the amount of moisture admitted to a space and to control the rate at which moisture is admitted to such a space. Accordingly, the temperature regulator, in combination with the electrolytic cell, finds utility in applications different from the particular application described above. For example, a regulator-cell combination may be used to regulate the humidity in rooms. In the above description the moisture controlled space is wholly enclosed by the cell.

While the invention has been described above in conjunction with specific apparatus and in a specific application, this has been by way of example only and is not to be considered as a limitation to the scope of this invention.

I claim:

1. Apparatus for determining the amount of moisture entering a space from a moisture source comprising an electrolytic cell having a pair of spaced apart electrodes, a body of hygroscopic material interconnecting the electrodes and exposed to the space, means for communicating the moisture source with the space for fluid flow therebetween, controllable means for releasing moisture from the moisture source into the space for absorption by the hygroscopic material, means coupled to the cell for impressing a potential across the cell electrodes for electrolysis of the moisture absorbed by the hygroscopic material, the electrolysis current flow between the electrodes through the hygroscopic material being related to the quantity of moisture electrolyzed in the cell, and means coupled between the cell and the controllable means and responsive to the electrolysis current flow for controlling the rate of release of moisture from the moisture source to the space in a predetermined relation to the electrolysis current of the cell.

2. Apparatus for determining the amount of moisture entering a space from a moisture source comprising an electrolytic cell having a pair of spaced apart electrodes bridged by a film of hygroscopic material, the hygroscopic material being exposed to the space, controllable means coupled to the moisture source for dissipating moisture from the moisture source, means connecting the moisture source and the space for transporting the dissipated moisture to the space for absorption by the hygroscopic material, means coupled to the cell for impressing a potential across the cell electrodes for electrolysis of the moisture absorbed by the hygroscopic material, the electrolysis current flow through the hygroscopic material being related to the quantity of moisture electrolyzed in the cell, and means responsive to the electrolysis current flow and coupled between the cell and the controllable means for controlling the rate of moisture released in an inverse relation to the electrolysis current flow.

3. A quantitative analysis apparatus for determining the amount of water in a sample comprising a dry gas supply, an oven in which the sample is heated to release moisture from the sample, electrical sample heating means in the oven, an electrolytic cell having a pair of spaced apart electrodes and a layer of hygroscopic material bridging the electrodes in the interior of the cell, means for passing dry gas through the oven to the cell to transport the moisture from the sample to the cell for absorption of said moisture by the hygroscopic material, means coupled to the cell for impressing a potential across the cell electrodes to electrolyze the moisture absorbed by the hygroscopic material, the cell electrolysis current comprising the electrical output of the cell, electrical feedback regulating means coupled between the cell and the heating means and responsive to the electrical output of the cell to regulate the electrical input to the heating means in inverse relation thereto so that the sample moisture release rate is maintained below the cell moisture absorption overload rate, and current integrator means coupled to the cell and responsive to the electrical output of the cell to provide an indication of the total amount of moisture absorbed in the cell.

4. Apparatus according to claim 2 wherein the means for transporting the dissipated moisture comprises a dry gas supply, an enclosure around the moisture dissipation means, and duct means from the dry gas supply to the enclosure and from the enclosure to the space.

5. Apparatus according to claim 2 wherein the controllable means comprises an electric induction coil surrounding the moisture source, and wherein the means connected between the cell and the controllable means comprise electrical feedback means.

6. Apparatus according to claim 5 wherein the space is enclosed by the electrolytic cell and wherein the moisture source comprises a sample of solid material.

7. An analysis apparatus for determining the amount of moisture in a sample comprising a heater for raising the temperature of the sample to release moisture from the sample, an electrolytic cell having a pair of spaced apart electrodes embedded in a film of hygroscopic material, means for passing the moisture released from the sample into contact with the hygroscopic material for absorption thereby, means coupled to the cell for impressing a potential across the cell electrodes for electrolysis of the moisture absorbed by the hygroscopic material, and means coupled between the cell and the heater for regulating the energy output of the heater in inverse relation to the electrolysis current of the cell.

8. Apparatus according to claim 7 wherein the means for regulating includes current integrating means operated by the electrolysis current of the cell.

9. A solids moisture analysis apparatus comprising an oven in which a sample under analysis is heated to drive off moisture from the sample, an electrolytic cell having a pair of electrodes bridged by a film of hygroscopic material disposed interiorly of the cell, duct means communicating from the oven to the interior of the cell for conveying moisture from the sample to the cell, means coupled to the cell for impressing an electric potential across the cell electrodes to electrolyze moisture absorbed by the hygroscopic material, and electrical feedback means coupled between the cell and the oven to regulate the energy input to the oven in inverse relation to the electrolysis current flowing through the cell.

10. Analysis apparatus according to claim 3 wherein the electrical sample heating means comprises an RF induction coil.

References Cited in the file of this patent
UNITED STATES PATENTS

| | | |
|---|---|---|
| 2,830,945 | Keidel | Apr. 15, 1958 |
| 2,934,693 | Reinecke et al. | Apr. 26, 1960 |
| 3,001,918 | Czuba | Sept. 26, 1961 |